(12) United States Patent
Reial

(10) Patent No.: US 8,842,789 B2
(45) Date of Patent: Sep. 23, 2014

(54) COEFFICIENT-SPECIFIC FILTERING OF INITIAL CHANNEL ESTIMATES

(71) Applicant: Andres Reial, Malmö (SE)

(72) Inventor: Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 160 days.

(21) Appl. No.: 13/679,064

(22) Filed: Nov. 16, 2012

(65) Prior Publication Data

US 2014/0140454 A1     May 22, 2014

(51) Int. Cl.
    *H04B 1/10*                (2006.01)
    *H04L 25/02*            (2006.01)

(52) U.S. Cl.
    CPC .................................. *H04L 25/0204* (2013.01)
    USPC ........................................................ 375/350

(58) Field of Classification Search
    USPC ........................... 375/260, 316, 340, 346–350
    See application file for complete search history.

(56) References Cited

U.S. PATENT DOCUMENTS

| | | | |
|---|---|---|---|
| 5,465,316 A * | 11/1995 | Tanaka | 704/219 |
| 6,654,408 B1 * | 11/2003 | Kadous et al. | 375/148 |
| 7,362,792 B2 | 4/2008 | Reial | |
| 7,428,262 B2 | 9/2008 | Zancho et al. | |
| 7,508,870 B2 * | 3/2009 | Denk | 375/229 |
| 7,848,463 B2 | 12/2010 | Li et al. | |
| 8,406,344 B2 * | 3/2013 | Eitel | 375/324 |
| 2002/0131537 A1 | 9/2002 | Storm et al. | |
| 2004/0076333 A1 * | 4/2004 | Zhang et al. | 382/238 |
| 2005/0036537 A1 | 2/2005 | Zancho et al. | |
| 2005/0152436 A1 | 7/2005 | Reial | |
| 2006/0067383 A1 | 3/2006 | Cozzo et al. | |
| 2006/0128326 A1 | 6/2006 | Pietraski | |
| 2006/0227887 A1 | 10/2006 | Li et al. | |
| 2008/0130797 A1 | 6/2008 | Cozzo et al. | |
| 2008/0232439 A1 * | 9/2008 | Chen | 375/148 |

(Continued)

FOREIGN PATENT DOCUMENTS

| | | |
|---|---|---|
| WO | 9950969 A2 | 10/1999 |
| WO | 2007003680 A1 | 1/2007 |
| WO | 2011066573 A1 | 6/2011 |

OTHER PUBLICATIONS

Ling, F., "Optimal Reception, Performance Bound, and Cutoff Rate Analysis of References-Assisted Coherent CDMA Communications with Applications", IEEE Transactions on Communications, Oct. 1999, pp. 1583-1592, vol. 47, No. 10.

(Continued)

*Primary Examiner* — Khanh C Tran
(74) *Attorney, Agent, or Firm* — Coats & Bennett, PLLC

(57) ABSTRACT

Embodiments herein include a method of channel estimation in a wireless communication node. The method comprises generating, based on samples of a received signal, initial estimates of a plurality of channel coefficients forming a channel response. The method also entails, for each of the channel coefficients, dynamically calculating a coefficient-specific filter span for that channel coefficient. Notably, the coefficient-specific filter span for any given channel coefficient is calculated according to a closed-form function that minimizes aggregated estimation noise for the channel coefficient and estimation bias attributable to errors in tracking the channel coefficient. The method finally includes adapting filtering of the initial estimates independently for each of the channel coefficients to be performed over the coefficient-specific filter span calculated for that channel coefficient.

29 Claims, 8 Drawing Sheets

(56) References Cited

U.S. PATENT DOCUMENTS

2009/0207955 A1* 8/2009 Hoshuyama et al. ......... 375/346
2010/0260237 A1   10/2010 Jonsson
2012/0069872 A1   3/2012 Sheu
2012/0106614 A1   5/2012 Kim et al.

OTHER PUBLICATIONS

Bottomley, G. et al., "Rake Reception With Channel Estimation Error", IEEE Transactions on Vehicular Technology, Nov. 2006, pp. 1923-1926, vol. 55, No. 6.

* cited by examiner

COEFFICIENT-SPECIFIC FILTERING OF INITIAL CHANNEL ESTIMATES

TECHNICAL FIELD

The present invention generally relates to estimating a plurality of channel coefficients forming a channel response, and particularly relates to adapting filtering of initial estimates of those channel coefficients.

BACKGROUND

A wireless communication receiver estimates the actual signal distorting characteristics of the propagation channel over which it receives a signal. These signal distorting characteristics are represented by the channel transfer function, also referred to as simply the channel response. By estimating the channel response, the receiver can compensate the received signal for channel-induced distortion in order to improve data extraction.

Filtering an initial estimate of the channel response to suppress noise generally produces an estimate with better quality. This suggests that filtering should be performed to a greater extent (e.g., over a longer period of time) as the noisiness of the initial estimate increases. On the other hand, filtering the initiate estimate hampers tracking of the channel response as the response changes. This suggests that filtering should be performed to a lesser extent as the variation rate of the channel response increases, e.g., as the receiver velocity increases. Known estimation approaches therefore adapt the extent of filtering to address both initial estimate noise and channel response tracking.

Despite adapting filtering in this way, many conventional approaches still prove to be suboptimal when the channel response is formed from multiple channel coefficients. In a Direct Sequence Code Division Multiple Access (DS-CDMA) system, for instance, the channel response is typically formed from multiple channel coefficients corresponding to different path delays. And in an Orthogonal Frequency Division Multiplexing (OFDM) system, the channel response is formed from multiple channel coefficients corresponding to different locations in the time-frequency grid. Regardless of the system type, the conventional approaches filter initial estimates for all of the channel coefficients to the same extent. This uniform filtering across all channel coefficients produces suboptimal filtered estimates because the initial estimates of different channel coefficients often have different degrees of noisiness, meaning that at least some of the initial estimates are filtered to a greater or lesser extent than actually needed.

Other approaches provide better filtered estimates by filtering initial estimates of different channel coefficients to different extents. See, e.g., U.S. Pat. No. 7,428,262, U.S. Pat. Pub. No. 2006/0128326, and U.S. Pat. No. 7,848,463. However, certain aspects of these approaches are still suboptimal. Indeed, some of the approaches rely on an offline evaluation of the filtering extent that is optimal for different channel coefficients under different conditions, meaning that the receiver is burdened with maintaining multi-dimensional look-up tables. Other approaches inefficiently test filtering the initial estimates with different candidate filter configurations and use whichever filtered estimates have the best quality.

SUMMARY

Embodiments herein advantageously address deficiencies of known approaches for filtering initial estimates of a channel response formed from multiple channel coefficients. Rather than burdening a receiver with multi-dimensional look-up tables or inefficient test filtering, embodiments herein dynamically calculate coefficient-specific filter spans for the response's channel coefficients according to a closed-form function.

More particularly, one or more embodiments include a method of channel estimation in a wireless communication node. The method includes generating, based on samples of a received signal, initial estimates of a plurality of channel coefficients forming a channel response. The method further entails, for each of the channel coefficients, dynamically calculating a coefficient-specific filter span for that channel coefficient according to a closed-form function that minimizes aggregated estimation noise for the channel coefficient and estimation bias attributable to errors in tracking the channel coefficient. A coefficient-specific filter span for a given channel coefficient is a filter span (in time or frequency) over which the initial estimate of that specific channel coefficient is to be filtered. Having calculated such a filter span for each coefficient, the method includes adapting filtering of the initial estimates independently for each of the channel coefficients to be performed over the coefficient-specific filter span calculated for that channel coefficient.

In some embodiments, for example, the closed-form function according to which the coefficient-specific filter span is calculated for any given one of the channel coefficients expresses that filter span as a function of a signal-to-interference-plus-noise ratio (SINR) associated with the initiate estimate of the given channel coefficient and a Doppler spread associated with the given channel coefficient. This SINR may be estimated in one or more embodiments by non-parametrically estimating an interference-plus-noise power associated with that initial estimate. In other embodiments, though, the SINR may be estimated by analytically computing the interference-plus-noise power associated with that initial estimate. In this case, the interference-plus-noise power associated with the initial estimate is computed as a function of interfering power leaked into the initial estimate during despreading and a geometry factor comprising the ratio of total transmitted power received at the node to the total interference-plus-noise power at the node.

In still other embodiments where the channel response is a DS-CDMA channel response, the closed-form function according to which the coefficient-specific filter span is alternatively calculated for any given one of the channel coefficients expresses that filter span as a function of a Doppler spread associated with the given channel coefficient, a fraction of an aligned power delay profile captured by the given channel coefficient, and the geometry factor.

Regardless, this closed-form function in at least some embodiments expresses the filter span for a given channel coefficient as a function of a reference estimation noise power for a reference filter span, as well as a function of a reference estimation bias power for a reference Doppler spread and a reference filter span. Alternatively or additionally, the closed-form function expresses that filter span as a function of one or more parameters associated with a type of adaptive filtering to be performed.

In any case, the Doppler spread associated with a given channel coefficient in some embodiments comprises a common Doppler spread that is commonly associated with each of the channel coefficients forming the channel response. In other embodiments, though, the Doppler spread is specifically associated with the given channel coefficient. In this case, different Doppler spreads are estimated as being associated with different channel coefficients forming the channel response. Thus, the Doppler spread associated with a given channel coefficient may differ from the Doppler spread associated with at least one other channel coefficient.

Yet other embodiments avoid under-estimation of the Doppler spread through Doppler spread biasing. Specifically, one or more embodiments estimate the Doppler spread associated with any given channel coefficient by biasing an initial estimate of the Doppler spread by an amount determined as a function of a reliability of that initial estimate.

Furthermore, one or more embodiments herein perform the above described filter span calculation and adaptation iteratively over the channel coefficients. In this case, responsive to obtaining filtered estimates for each of the channel coefficients, the channel response formed from the filtered estimated is provided to one or more additional processing circuits for further processing of the received signal.

Embodiments herein also include a corresponding receiver and a wireless communication node (e.g., a base station or a wireless communication device) configured to perform the processing described above.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
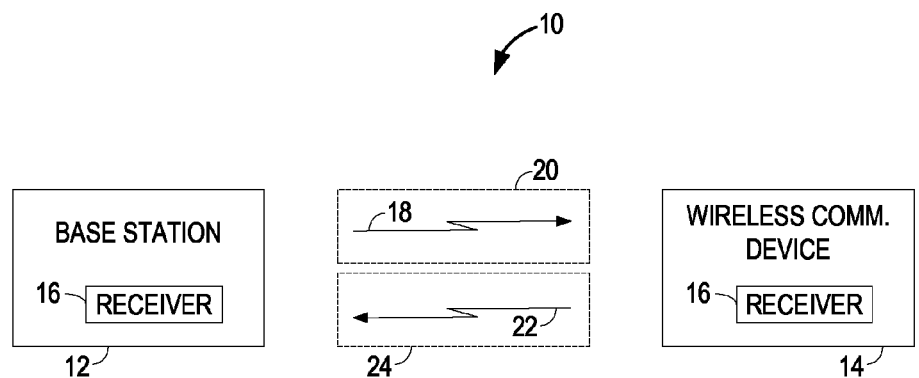
FIG. 1 is a block diagram of a wireless communication network that supports communication by at least one wireless communication node configured according to one or more embodiments herein.

FIG. 1 depicts a wireless communication network 10 that supports wireless communications between wireless communication nodes, namely a base station 12 and a wireless communication device 14. The base station 12 comprises, for example, a WCDMA, HSPA, LTE, or other type of base station, and the device 14 comprises a cellular radiotelephone, a smartphone, a laptop computer, a machine-to-machine (M2M) device, or the like.

In some embodiments, the wireless communication device 14 includes an embodiment of a receiver 16 as taught herein for processing downlink signals 18 transmitted by the base station 12 over a downlink channel 20. Additionally or alternatively, the base station 12 includes an embodiment of the receiver 16 as taught herein for processing uplink signals 22 transmitted by the wireless communication device 14 over an uplink channel 24, which may or may not be the same as the downlink channel 20.

Figure 2:
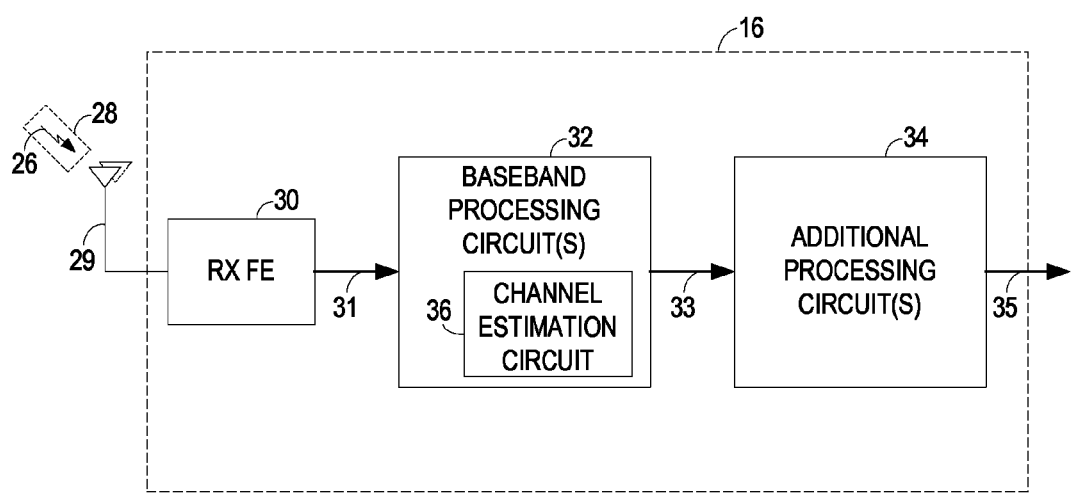
FIG. 2 is a block diagram of a receiver of a wireless communication node configured to perform channel estimation according to one or more embodiments.

FIG. 2 illustrates additional details of such a receiver 16, as employed by the base station 12 and/or the wireless communication device 14 for receiving a signal 26 over a channel 28 via one or more antennas 29. The receiver 16 includes a receiver (RX) front-end (FE) 30, one or more baseband processing circuits 32, and one or more additional processing circuits 34. The receiver front end 30 typically includes filters, mixers, and/or conversion circuits, such as analog-to-digital converters, configured to produce a series of digitized baseband samples 31 of the received signal 26. The one or more baseband processing circuits 32 process these samples to produce estimates 33 of symbols conveyed by the received signal 26. The symbol estimates 33 are then processed further, as necessary, by the one or more additional processing circuits 34. For example, the one or more additional processing circuits 34 may include a decoder that determines information bit values 35 based on the symbol estimates 33 provided by the one or more baseband processing circuits 22. These information bit values 35 may then be converted to speech, images, etc.

As part of processing the received signal samples 31, a channel estimation circuit 36 included in the one or more baseband processing circuits 32 estimates the actual signal distorting characteristics of the channel 28 over which the signal 26 is received. These signal distorting characteristics are represented by the channel transfer function, also referred to as simply the channel response h. By estimating the channel response h, the one or more baseband processing circuits 32 can compensate the received signal 26 for channel-induced distortion in order to improve data extraction.

Figure 3:
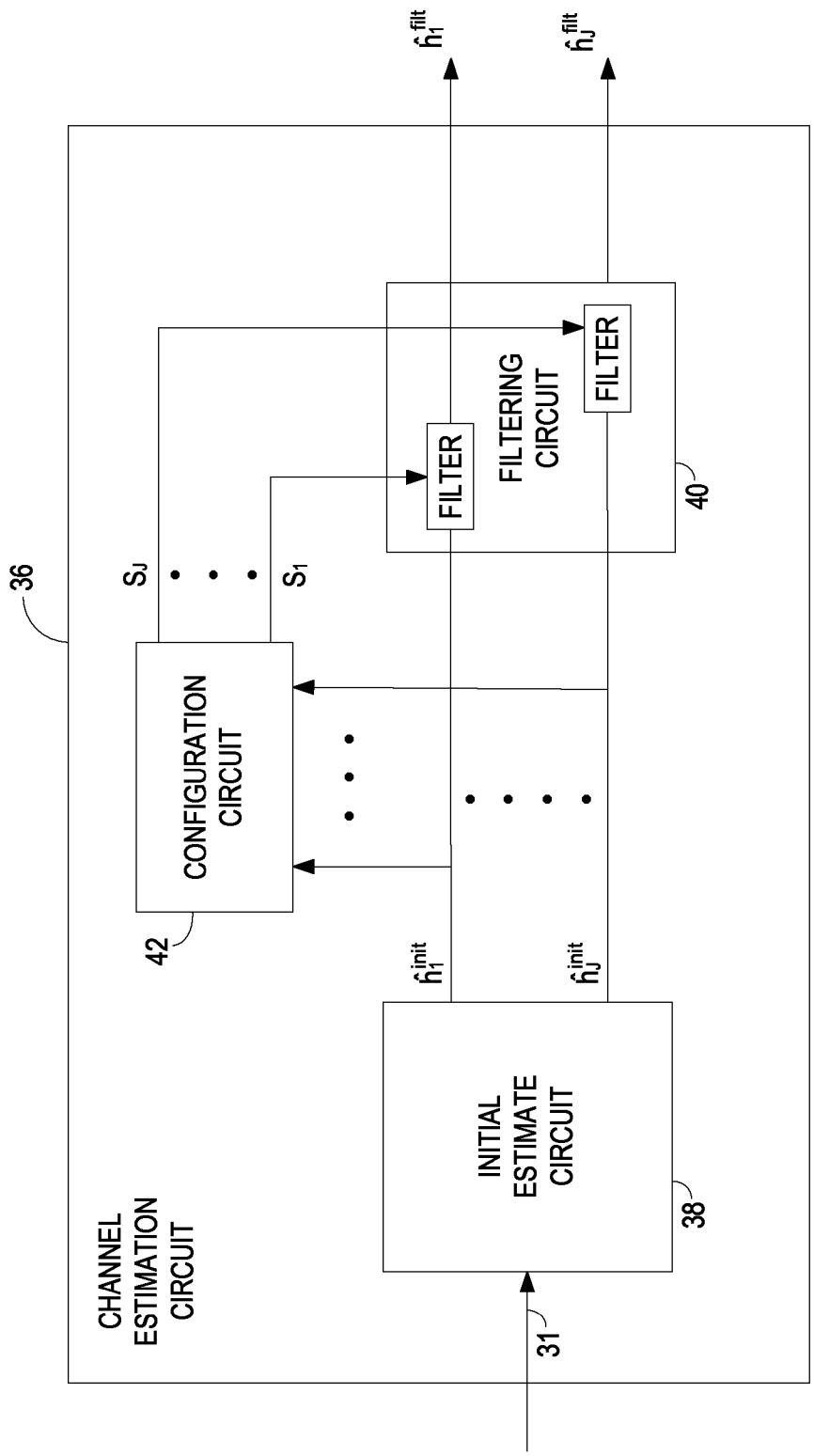
FIG. 3 is a block diagram of a channel estimation circuit included in the receiver of FIG. 2 according to one or more embodiments.

The channel estimation circuit 36 herein proves particularly advantageous for estimating the channel response h when the response h is formed from a plurality of channel coefficients $h=[h_1, h_2, \ldots h_J]$. This is the case, for instance, when the channel response h comprises a DS-CDMA channel response, with different channel coefficients $h_j$ corresponding to different propagation path delays. And this is also the case, as another example, when the channel response h comprises an OFDM channel response, with different channel coefficients $h_j$ corresponding to different locations in the time-frequency grid. Regardless, in these and other cases, the channel estimation circuit 36 proves advantageous because it performs coefficient-specific estimate filtering according to a closed-form function rather than resorting to burdensome multi-dimensional look-up tables or inefficient candidate filter testing. FIG. 3 illustrates additional details in this regard.

As shown in FIG. 3, the channel estimate circuit 36 includes an initial estimate circuit 38, a filtering circuit 40, and a configuration circuit 42. The initial estimate circuit 38 is configured to generate, based on samples 31 of the received signal 26, initial estimates $\hat{h}_1^{init}, \hat{h}_2^{init}, \ldots, \hat{h}_J^{init}$ of a plurality of channel coefficients forming the channel response h. The filtering circuit 40 is configured to filter these initial estimates in order to produce filtered estimates $\hat{h}_1^{filt}, \hat{h}_2^{filt}, \ldots, \hat{h}_J^{filt}$ with better quality. The configuration circuit 42 configures and otherwise adapts the filtering performed by the filtering circuit 40.

In more detail, the configuration circuit 42 dynamically calculates a coefficient-specific filter span $S_j$ for each of the channel coefficients. A filter span as used herein is a span in the time domain or in the frequency domain over which filtering is to be performed. A coefficient-specific filter span $S_j$ for a channel coefficient j is therefore a filter span over which the initial estimate $\hat{h}_j^{init}$ of that specific channel coefficient j is to be filtered. With the filter spans being coefficient-specific, filter spans calculated for different channel coefficients may differ.

Notably, the configuration circuit 42 dynamically calculates the coefficient-specific filter span $S_j$ for any given one of the channel coefficients j according to a closed-form function $f(\cdot)$. A closed-form function as used herein is an expression which relates any input from the function's domain to exactly one output from the function's codomain and which can be written analytically in terms of a finite number of certain well-known functions (e.g., elementary functions). In calculating the filter span for a given one of the channel coefficients j according to a closed-form function $f(\cdot)$, the function advantageously minimizes aggregated estimation noise for the channel coefficient j and estimation bias attributable to errors in tracking the channel coefficient j.

Having calculated filter spans $S_j$ for each of the channel coefficients j, the configuration circuit 42 adapts the filtering circuit's filtering of the initial estimates $\hat{h}_1^{init}, \hat{h}_2^{init}, \ldots, \hat{h}_J^{init}$ independently for each of the channel coefficients j. In particular, the configuration circuit 42 adapts filtering of the initial estimate $\hat{h}_j^{init}$ of any given channel coefficient j to be performed over the coefficient-specific filter span $S_j$ calculated for that channel coefficient j. FIG. 3 for instance depicts the configuration circuit 42 providing the filter span $S_j$ calculated for each channel coefficient j to a respective filter of the filtering circuit 40 that filters the initial estimate $\hat{h}_1^{init}$ of that coefficient j.

Figure 4:
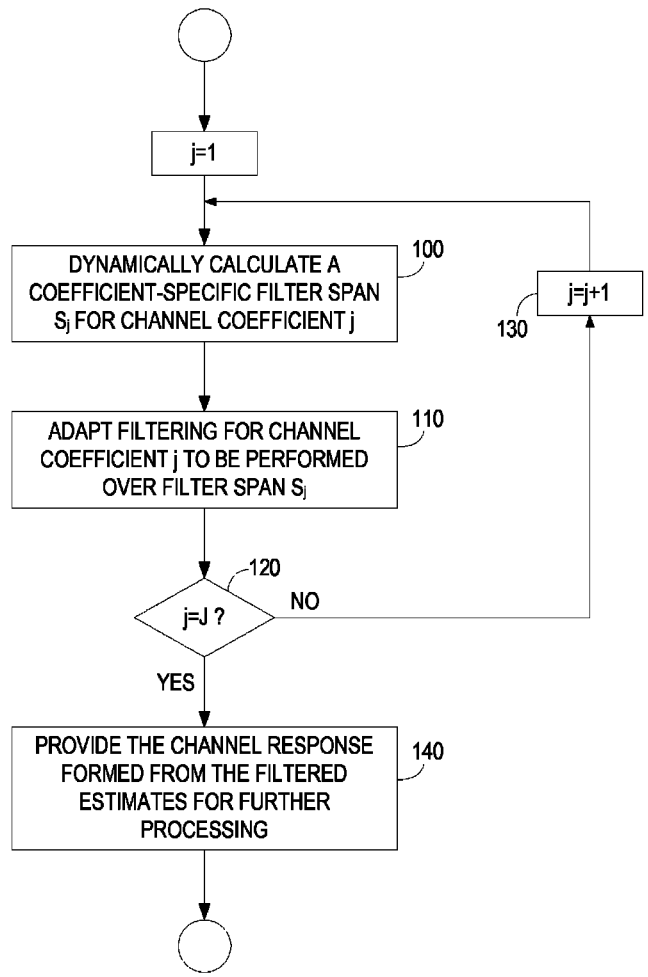
FIG. 4 is a logic flow diagram of processing performed by a configuration circuit of the channel estimation circuit of FIG. 3, for iterative filter span calculation and adaptation according to one or more embodiments.

In at least some embodiments, the configuration circuit 42 performs this calculation and adaptation iteratively over the channel coefficients. FIG. 4 illustrates one such embodiment. As shown in FIG. 4, the configuration circuit 42 dynamically calculates a coefficient-specific filter span $S_j$ for a first one of the channel coefficients j=1 (Block 100) and adapts filtering for that coefficient to be performed over the calculated filter span $S_j$ (Block 110). The configuration circuit 42 then repeats this process iteratively for subsequent channel coefficients $1 < j \leq J$ (Block 120 and 130) until span calculation and filter adaptation has been performed for all of the channel coefficients (YES at Block 120). Then, responsive to obtaining filtered estimates $\hat{h}_1^{filt}, \hat{h}_2^{filt}, \ldots \hat{h}_J^{filt}$ for each of the channel coefficients $1 \leq j \leq J$, the filtering circuit 40 provides the channel response formed from the filtered estimates to one or more additional processing circuits (not shown) for further processing of the received signal 26. In some embodiments, for example, these one or more additional processing circuits include a weight generation circuit configured to generate combining weights for equalization and/or a regeneration circuit configured to regenerate one or more components of the received signal 26 for interference cancellation.

Figure 5:
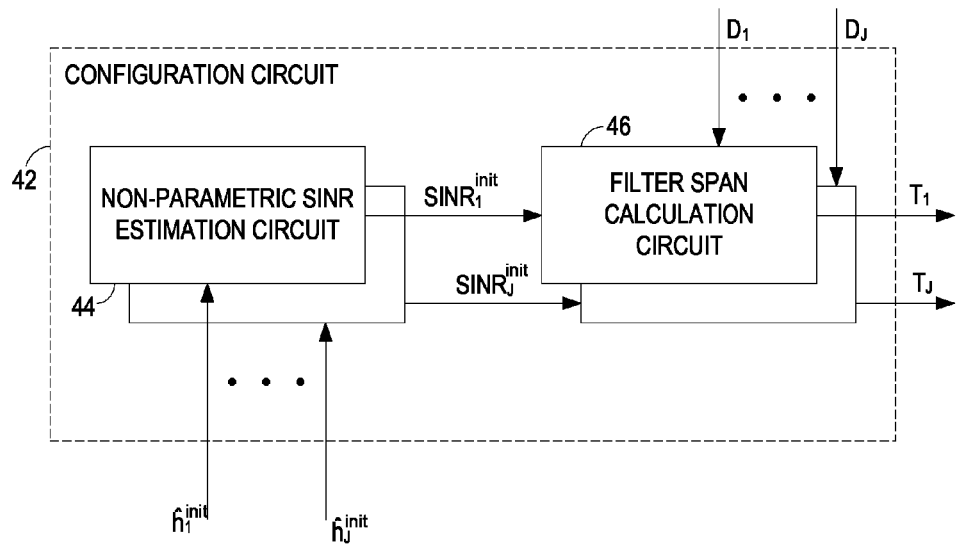
FIG. 5 is a block diagram of a channel estimation circuit's configuration circuit according to one or more non-parametric SINR estimation embodiments.
Figure 6:
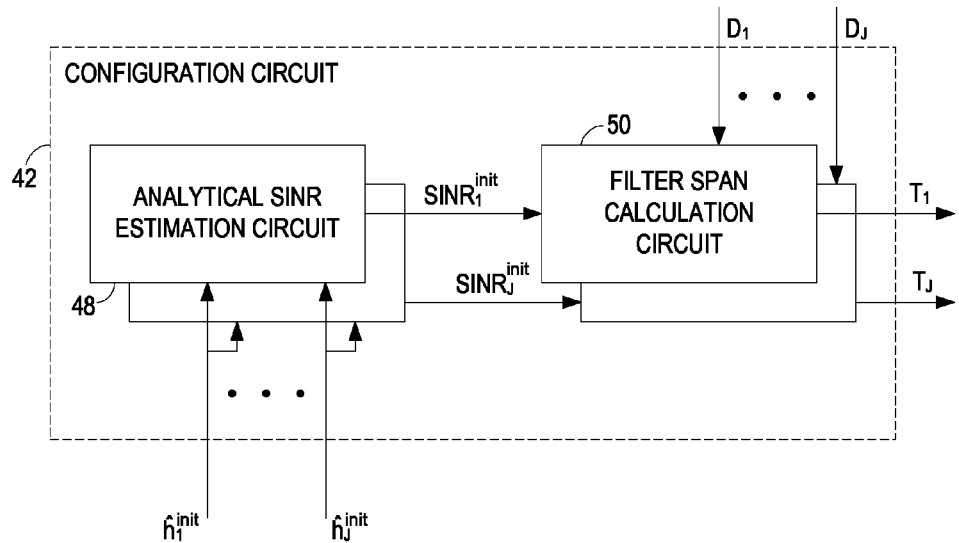
FIG. 6 is a block diagram of a channel estimation circuit's configuration circuit according to one or more analytical SINR estimation embodiments.

Regardless, the closed-form function $\theta(\cdot)$ according to which the coefficient-specific filter span $S_j$ is calculated for any given one j of the channel coefficients may express the filter span $S_j$ in any number of ways. In some embodiments, for example, the closed-form function $f(\cdot)$ expresses the filter span $S_j$ as a function of a signal-to-interference-plus-noise ratio $SINR_j^{init}$ associated with the initiate estimate $\hat{h}_j^{init}$ of the given channel coefficient j and a Doppler spread $D_j$ associated with the given channel coefficient. FIGS. 5 and 6 illustrate different ones of these embodiments, in the context of examples where the filter span $S_j$ is represented in the time domain and is therefore appropriately shown as filter span $T_j$ (where the filter span $T_j$ in the time domain may also be understood as the filter time, filter time constant, filter length, etc.).

As depicted in FIG. 5, the configuration circuit 42 includes a non-parametric SINR estimation circuit 44 and a filter span calculation circuit 46 for each channel coefficient j. The non-parametric SINR estimation circuit 44 for any given one j of the channel coefficients is configured to estimate the $SINR_j^{init}$ associated with the initial estimate is of the given channel coefficient. As part of estimating $SINR_j^{init}$, the circuit 44 non-parametrically (e.g. without a defined model or function) estimates an interference-plus-noise power $\sigma_{n,j}^2$ associated with the initial estimate $\hat{h}_j^{init}$. In some embodiments, for instance, the non-parametric SINR estimation circuit 44 estimates this interference-plus-noise power $\sigma_{n,j}^2$ on-line from the actual sequence of initiate estimates $\hat{h}_j^{init}$ over time, e.g., by computing the power of residuals with respect to a short-term average value. In any case, the non-parametric SINR estimation circuit 44 also estimates the signal power associated with the initial estimate $\hat{h}_j^{init}$. In some embodiments, the estimation circuit 44 simply determines this signal power as $|\hat{h}_j^{init}|^2$, meaning that the estimated $$SINR_j^{init} = \frac{|\hat{h}_j^{init}|^2}{\sigma_{n,j}^2}.$$

In other embodiments (not shown), the estimation circuit 44 recursively determines the signal power from previously filtered estimates as $|\hat{h}_j^{filt}|^2$, meaning that $$SINR_j^{init} = \frac{|\hat{h}_j^{filt}|^2}{\sigma_{n,j}^2}.$$

Regardless, the filter span calculation circuit 46 for the given channel coefficient j obtains $SINR_j^{init}$ from the respective non-parametric SINR estimation circuit 44. The filter span calculation circuit 46 also receives the Doppler spread $D_j$ associated with the given channel coefficient j, e.g., from a Doppler spread estimation circuit (not shown). In some embodiments, the Doppler spread $D_j$ associated with the given channel coefficient j comprises a common Doppler spread that is commonly associated with each of the channel coefficients forming the channel response. In other embodiments, though, the Doppler spread $D_j$ is specifically associated with the given channel coefficient j, meaning that it may differ from the Doppler spread $D_i$ associated with a different channel coefficient i, where $i \neq j$. Different Doppler spreads for different channel coefficients may be more appropriate for a DS-CDMA channel response, for instance, when different reflections forming a DS-CDMA delay profile originate from objects moving at different speeds and/or directions, or from different antennas in a distributed antenna system. In any case, the Doppler spread $D_j$ may be obtained using established techniques, e.g., via spectral analysis or zero-crossing counts.

Irrespective of whether $D_j$ is specific to coefficient j or is common with other coefficients, the respective filter span calculation circuit 46 is configured to calculate $T_j$ for that coefficient j according to a closed-form function $f(\bullet)$ that expresses $T_j$ as a function of $SINR_j^{init}$ and $D_j$. Such calculation notably occurs on-line, without resorting to a multi-dimensional lookup table indexed by the current channel conditions. Moreover, in at least some embodiments, the closed-form function $f(\bullet)$ expresses $T_j$ also as a function of a reference estimation noise power for a reference filter span, as well as a function of a reference estimation bias power for a reference Doppler spread and a reference filter span. Alternatively or additionally, the closed-form function $f(\bullet)$ in other embodiments expresses $T_j$ also as a function of one or more parameters associated with a type of filtering to be performed by the filtering circuit 40.

Consider an example for a Rayleigh fading channel. In this case, the normalized estimation bias power $I_{j,norm}^{bias}$ as attributable to errors in tracking a given channel coefficient j may be expressed in power form for commonly used filter configurations as:

$$I_{j,norm}^{bias}(D_j, T_j) = I_{ref}^{bias}\left(\frac{D_j T_j}{D_{ref} T_{ref}}\right)^q = k_b D_j^q T_j^q, \qquad (1)$$

where $I_{ref}^{bias}$ is the reference estimation bias power that is produced by the filter configuration defined by the exponent q, for the reference Doppler spread $D_{ref}$ and the reference filter span $T_{ref}$, and $$k_b = \frac{I_{ref}^{bias}}{D_{ref} T_{ref}}.$$

In some embodiments, for instance, a filter configuration that is characterized by a rectangular filter window centered around the time instant of interest is defined by q=4, as previously determined based on numerical evaluation. In other embodiments, a filter configuration that is characterized by a rectangular filter window filtering only past measurements is defined by q=2. Of course, these are just some examples as the bias estimation bias power $I_{j,norm}^{bias}$ for other practical filter configurations (e.g., partial look-ahead, exponential smoothing, etc.) also fit the above model. In any case, equation (1) suggests that the estimation bias power $I_{j,norm}^{bias}$ grows rapidly for higher Doppler spreads $D_j$ (e.g., for higher receiver speeds) and/or greater filter spans $T_j$.

The actual estimation bias power $I_j^{bias}$ attributable to errors in tracking the given channel coefficient j becomes:

$$I_j^{bias}(D_j,T_j)=|\hat{h}_j^{init}|^2 I_{j,norm}^{bias}(D_j,T_j), \qquad (2)$$

where the normalized estimation bias power $I_{j,norm}^{bias}$ is provided by equation (1) and the initial estimate $\hat{h}_j^{init}$ of the given channel coefficient j is used (as noted above, previously filtered estimates $\hat{h}_j^{filt}$ may be used instead).

Moreover, the corresponding normalized estimation noise power $I_{j,norm}^{noise}$ for the given channel coefficient j (modeled at the output of a respective filter with filtering span $T_j$) is given by:

$$I_{j,norm}^{noise}(T_j) = I_{ref}^{noise}\frac{T_{ref}}{T_j} = k_n\frac{1}{T_j}, \qquad (3)$$

where $I_{ref}^{norm}$ is the reference estimation noise power at the output of the filter with a reference filtering span $T_{ref}$, and $k_n = I_{ref}^{noise} T_{ref}$. Equation (3) suggests that the normalized estimation noise power $I_{j,norm}^{bias}$ is inversely proportional to the filtering span $T_j$. The actual estimation noise power $I_j^{noise}$ for the given channel coefficient j becomes:

$$I_j^{noise}(T_j)=\sigma_{n,j}^2 I_{j,norm}^{noise}(T_j), \qquad (4)$$

where as indicated above $\sigma_{n,j}^2$ is the interference-plus-noise power associated with the initial estimate $\hat{h}_j^{init}$ of the given channel coefficient.

Embodiments herein collectively consider the aggregation of the actual estimation noise power $I_j^{noise}$ for the given channel coefficient j and the actual estimation bias power $I_j^{bias}$ attributable to errors in tracking the given channel coefficient j as being a total estimation error that should be minimized. The minimization in this regard seeks to obtain the optimal estimation bias and estimation noise trade-off for the given channel coefficient. The optimal filtering span $T_j$ that achieves this minimization of $I_j^{noise}+I_j^{bias}$ can be achieved by setting:

$$\frac{\partial}{\partial T}[I_j^{bias}(D_j, T_j) + I_j^{noise}(T_j)] = 0. \qquad (5)$$

Substituting equations (2) and (4) into equation (5), and solving for the filter span $T_j$ advantageously reveals a closed-form function $f(D_j,SINR_j^{init})$ that expresses the filter span, $T_j$, for any one given one of the channel coefficients, in terms of the Doppler spread, $D_j$, associated with the given channel coefficient and the estimate of the signal-to-interference-plus-noise ratio, $SINR_j^{init}$, associated with the initial estimate of the given channel coefficient:

$$T_j = f(D_j, SINR_j^{init}) = \left(\frac{k_n}{qD_j^q SINR_j^{init} k_b}\right)^{\frac{1}{q+1}}. \qquad (6)$$

In these embodiments, therefore, the filter span calculation circuit 46 for any given channel coefficient j dynamically calculates the filter span $T_j$ for that coefficient according to the closed-form function $f(D_j, SINR_j^{init})$ of equation (6). This calculation occurs on-line, although the parameters $k_n$, $k_b$, and q remain fixed for a given filter configuration or structure and may therefore be determined off-line. With the filter span $T_j$ calculated in this way, stronger channel coefficients typically are filtered less and weaker channel coefficients are filtered more, since the relative bias contribution from the latter is smaller.

While FIG. 5 and the above description contemplate non-parametric estimation of $SINR_j^{init}$ for input into equation (6), $SINR_j^{init}$ is computed analytically (or parametrically) in other embodiments. FIG. 6 shows one such embodiment where the channel response comprises a DS-CDMA channel response. As depicted in FIG. 6, the configuration circuit 42 includes an analytical SINR estimation circuit 48 for each of the channel coefficients. In contrast to the non-parametric SINR estimation circuit 44 of FIG. 5, the analytical SINR estimation circuit 48 for any given channel coefficient receives initial estimates $\hat{h}_1^{filt}, \hat{h}_2^{filt}, \ldots \hat{h}_J^{filt}$ for all of the channel coefficients $1 \leq j \leq J$. Based on these initial estimates, the estimation circuit 48 for a given channel coefficient j analytically computes $SINR_j^{init}$ as a function of interfering power leaked into the initial estimate $\hat{h}_j^{init}$ during despreading and a geometry factor. This geometry factor comprises the ratio of the total desired signal power received at the receiver 16 to the total interference-plus-noise power at the receiver 16. The geometry factor thereby expresses the overall relationship between the power available in the wanted (i.e., own) cell and the interference power coming from other, surrounding cells (plus noise). Contrasted with $SINR_j^{init}$, which concerns noise and interference from other channel coefficients i ($i \neq j$), the geometry factor concerns noise and interference from other cells and remains independent of the initial estimates $\hat{h}_1^{filt}$, $\hat{h}_2^{filt}, \ldots, \hat{h}_J^{filt}$.

The embodiment of FIG. 6 proves advantageous, for instance, in WCDMA or HSPA networks, where channel estimation is performed based on despreading a known pilot channel (CPICH). In this case, despreading leads to particularly strong, and predictable, differences in per-coefficient estimate qualities that can be exploited. As an additional advantage the analytical SINR modeling approach can be used. Indeed, when despreading a certain WCDMA channelization code, all other codes from the same OVSF code tree (transmitted using the same spreading code) are orthogonal to that code and are removed by the despreading process. However, this perfect code separation after despreading only holds when all the other code components in the received signal 26 are aligned with the selected despreading delay. Despreading at a delay that does not contain the full energy of the channel 28, such as by despreading off-peak on a single-path channel or at any delay on a dispersive channel, means that a fraction of the non-aligned power leaks into the despread symbol value as interference.

This leakage power for the initial estimate $\hat{h}_j^{init}$ of coefficient j is proportional to $$\frac{1}{SF} \sum_{i=1; i \neq j}^{J} |\hat{h}_i^{init}|^2,$$

on average, where SF=256 is the CPICH spreading factor and the summation term captures the signal power that is not aligned with the despreading delay. If the initial channel estimate is scaled so that the expected value $E[\hat{h}_j^{init}] = h_j$, the interference-plus-noise power $\sigma_{n,j}^2$ associated with the initial estimate $\hat{h}_j^{init}$ becomes:

$$\sigma_{n,j}^2 = \frac{1}{N_p \cdot SF} \frac{1}{E_p / I_{or}} \left( \sum_{i=1; i \neq j}^{J} |\hat{h}_i^{init}|^2 + \frac{1}{I_{or} / I_{oc}} \sum_{j=1}^{J} |\hat{h}_j^{init}|^2 \right) \quad (7)$$

where the first term in the parenthesis describes the leakage power (own-cell interference) and the second term describes other-cell interference and receiver noise. $N_p$ is the number of pilot symbols used to form the initial estimate (e.g. $N_p$=10 if averaging over one slot), $E_p/I_{or}$ is the pilot power allocation at the transmitter, and $I_{or}/I_{oc}$ is the geometry factor, with $I_{or}$ being the total desired signal power received at the receiver 16 and $I_{oc}$ being the total interference-plus-noise power at the receiver 16.

According to equation (7), the smaller the true channel coefficient value, the larger the leakage power. This means that the channel estimates for weaker channel taps or for the delays where only pulse shape ringing is present will be inherently noisier. This further emphasizes the need for coefficient-specific filtering, since the benefit from aggressive noise suppression for weak taps is significant.

Thus, according to some embodiments, the analytical SINR estimation circuit 48 for any given channel coefficient j analytically computes the interference-plus-noise power $\sigma_{n,j}^2$ associated with the coefficient's initial estimate $\hat{h}_j^{init}$ according to equation (7) as part of estimating $SINR_j^{init}$. The estimation circuit 48 in this regard needs only estimate the geometry factor, meaning that SINR estimation proves simpler than the non-parametric approach of FIG. 5. The estimation circuit 48 provides the estimated $SINR_j^{init}$ to the respective filter span calculation circuit 50, which calculates the filter span $T_j$ as described above according to equation (6).

Figure 7:
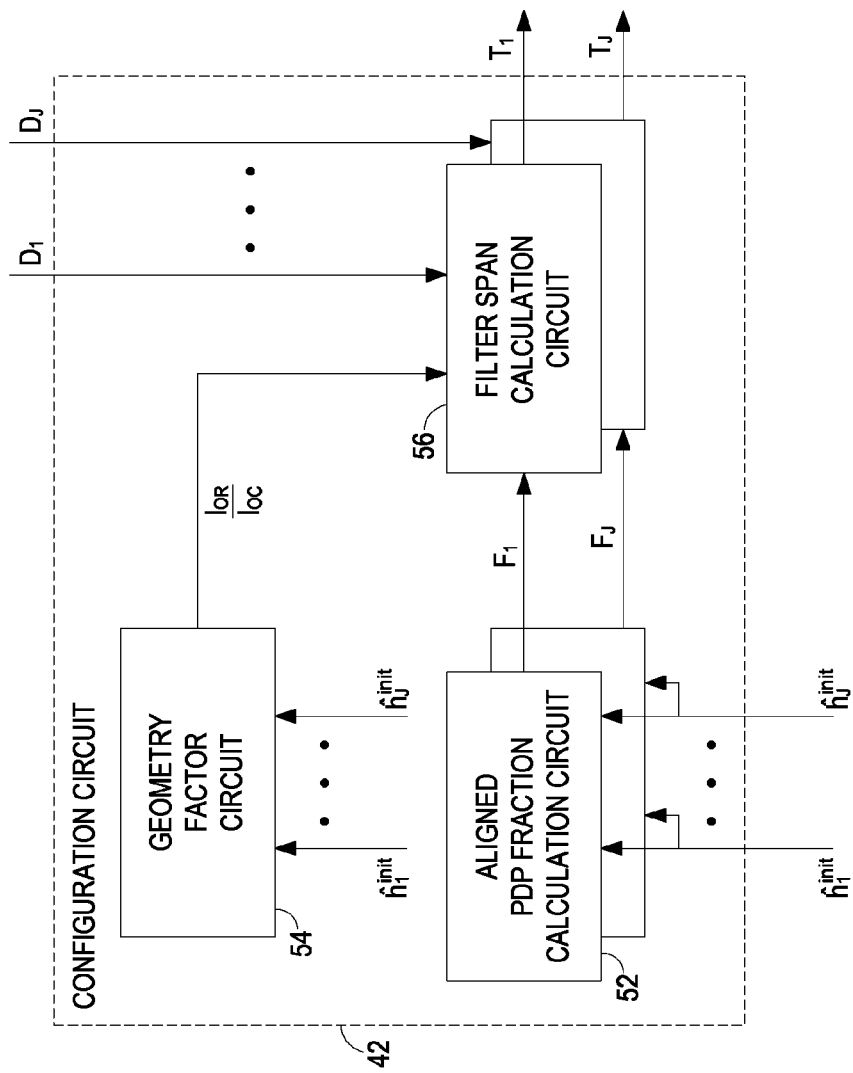
FIG. 7 is a block diagram of a channel estimation circuit's configuration circuit according to other embodiments where filter span is calculated as a function of a fraction of an aligned power delay profile captured by a given channel coefficient.

In still other embodiments applicable to a DS-CDMA channel response, the closed-form function $f(\bullet)$ expresses the filter span $S_j$ as a function of $D_j$, the geometry factor $I_{or}/I_{oc}$, and a fraction of an aligned power delay profile (PDP) captured by the given channel coefficient j. FIG. 7 illustrates an example of one such embodiment.

As shown in FIG. 7, the configuration circuit 42 includes an aligned PDP fraction calculation circuit 52 for each channel coefficient, a geometry factor circuit 54, and a filter span calculation circuit 56 for each channel coefficient. The aligned PDP fraction calculation circuit 52 for any given channel coefficient j receives initial estimates $\hat{h}_1^{filt}, \hat{h}_2^{filt}, \ldots \hat{h}_J^{filt}$ for all of the channel coefficients $1 \leq j \leq J$. Based on these initial estimates, the fraction calculation circuit 52 for the given channel coefficient j computes a fraction $F_j$ of an aligned PDP captured by that coefficient.

The geometry factor circuit 54 appropriately computes the geometry factor $I_{or}/I_{oc}$. In at least some embodiments, this computation is performed based on the initial estimates $\hat{h}_1^{filt}$, $\hat{h}_2^{filt}, \ldots \hat{h}_J^{filt}$ for channel coefficients $1 \leq j \leq J$.

Based on $F_j$ and $I_{or}/I_{oc}$, as well as $D_j$, the filter span calculation circuit 56 for any given channel coefficient j computes the filter span $T_j$. In at least some embodiments, for example, $F_j$ as calculated by the aligned PDP fraction calculation circuit 52 is expressed as $$\frac{|\hat{h}_j^{init}|^2}{\sum_{i=1; i \neq j}^{J} |\hat{h}_i^{init}|^2}.$$

In this case, the filter span computation circuit efficiently calculates the filter span $T_j$ according to a closed-form function $f(D_j, F_j, I_{or}/I_{oc})$ that expresses $T_j$ as a function of the Doppler spread $D_j$ associated with the given channel coefficient, the fraction $F_j$ of the aligned power delay profile and the geometry factor $I_{or}/I_{oc}$:

$$T_j = f(D_j, F_j, I_{or}/I_{oc}) = \left( \frac{k_n \left(1 - F_j + \frac{1}{I_{or}/I_{oc}}\right)}{q k_b D_j^q F_j} \right)^{\frac{1}{q+1}}. \quad (8)$$

Again, this calculation occurs on-line, although the parameters $k_n$, $k_b$, and q remain fixed for a given filter configuration or structure and may therefore be determined off-line.

As for calculation of $F_j$, $I_{or}/I_{oc}$, and $D_j$, the aligned PDP fraction calculation circuit 52 may calculate $F_j$ responsive to receiving the initial estimates $\hat{h}_1^{filt}, \hat{h}_1^{filt}, \ldots, \hat{h}_1^{filt}$ and as part of the iterative processing shown in FIG. 4. The PDP, though, may be computed outside of FIG. 4's iterative processing. Similarly, $I_{or}/I_{oc}$ and $D_j$ may be computed outside of FIG. 4's iterative processing.

Irrespective of whether the filter span $T_j$ (or more generally $S_j$) is computed according to FIG. 5, 6, or 7, at least some embodiments herein take care to avoid under-estimating the Doppler spread $D_j$. Avoiding under-estimation of the Doppler spread $D_j$ safeguards the initial estimate $\hat{h}_j^{init}$ from being excessively filtered. This increases the robustness of channel estimation since post-filtering estimation error (i.e., $I_j^{noise}$+ $I_j^{bias}$) is highly sensitive to bias from excessive filtering.

In one or more embodiments, for example, the Doppler spread estimation circuit (not shown) guards against under-estimation of the Doppler spread through Doppler spread biasing. More particularly, the Doppler spread estimation circuit obtains an initiate estimate $D_j^{init}$ of the Doppler spread associated with any given channel coefficient j. The Doppler spread estimation circuit then obtains $D_j$ by biasing that initial estimate $D_j^{init}$ by an amount determined as a function of the reliability of that initial estimate $D_j^{init}$. In some embodiments, for instance, the initial estimate $D_j^{init}$ is positively biased (so that $D_j > D_j^{init}$) when the reliability of the initial estimate $D_j^{init}$ is low, so as to avoid under-estimation of $D_j$.

At least one embodiment recognizes that the reliability of the initial estimate $D_j^{init}$ depends on the value of that initial estimate $D_j^{init}$. Indeed, higher initial Doppler estimates $D_j^{init}$ typically prove to be more reliable, meaning that they require little or no safety margin to avoid under-estimation. Accordingly, in this case, the Doppler spread estimation circuit obtains $D_j$ by biasing the initial estimate $D_j^{init}$ by an amount determined as a function of that initial estimate $D_j^{init}$. In one example, for instance, the Doppler spread estimation circuit biases the initial estimate $D_j^{init}$ according to $D_j = \alpha(D_j^{init}) \cdot D_j^{init}$, where $\alpha$ is a biasing coefficient with a value that is greater than or equal to 1 and that is determined as a function of $D_j^{init}$. The choice for the particular function $\alpha(D_j^{init})$ may be implementation-dependent.

Those skilled in the art will appreciate that various equations and embodiments presented above largely stemmed from just one possible implementation and representation of estimation noise and/or estimation bias, meaning that they are simply non-limiting examples. Other equations and embodiments are contemplated as being based on other representations of estimation noise and/or estimation bias. In one embodiment, for example, rather than being represented by equation (1), the normalized estimation bias power $I_{j,norm}^{bias}$ attributable to errors in tracking a given channel coefficient j is expressed in extended polynomial form as:

$$I_{j,norm}^{bias}(D_j, T_j) = I_{ref}^{bias} \sum_{p=1}^{P} a_p \left( \frac{D_j T_j}{D_{ref} T_{ref}} \right)^p = k_b \sum_{p=1}^{P} a_p D_j^p T_j^p, \quad (9)$$

where the coefficient values $a_p$ and the polynomial order P depend on the filter configuration. In yet another embodiment, the normalized estimation bias power $I_{j,norm}^{bias}$ attributable to errors in tracking a given channel coefficient j is expressed in exponential form as:

$$I_{j,norm}^{bias}(D_j, T_j) = I_{ref}^{bias} b^{\left(c \frac{D_j T_j}{D_{ref} T_{ref}}\right)} = I_{ref}^{bias} k_b^{D_j T_j} \quad (10)$$

where the parameters b and c again depend on the filter configuration. As seen by just these few examples, other alternative representations of the normalized estimation bias power $I_{j,norm}^{bias}$ are contemplated herein. Stemming from these different representations, other closed-form functions $f(\bullet)$ may be derived as alternatives to those expressed in equations (6) and (8).

Further, those skilled in the art will appreciate that many of the embodiments above have not been described in the context of any particular wireless communication standard. Indeed, no particular communication interface standard is necessary for practicing the present invention. That is, the wireless communication network 10 may be any one of a number of standardized network implementations such as Wideband CDMA (WCDMA), High Speed Packet Access (HSPA), Long Term Evolution (LTE), LTE-Advanced, CDMA2000, or the like.

Moreover, the filter span contemplated herein may be applied in the time domain or in the frequency domain. Where the network 10 comprises an LTE or LTE-Advanced network based on OFDM, for instance, the filter span may be applied to realize frequency domain interpolation.

Those skilled in the art will also appreciate that the various "circuits" described may refer to a combination of analog and digital circuits, including one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
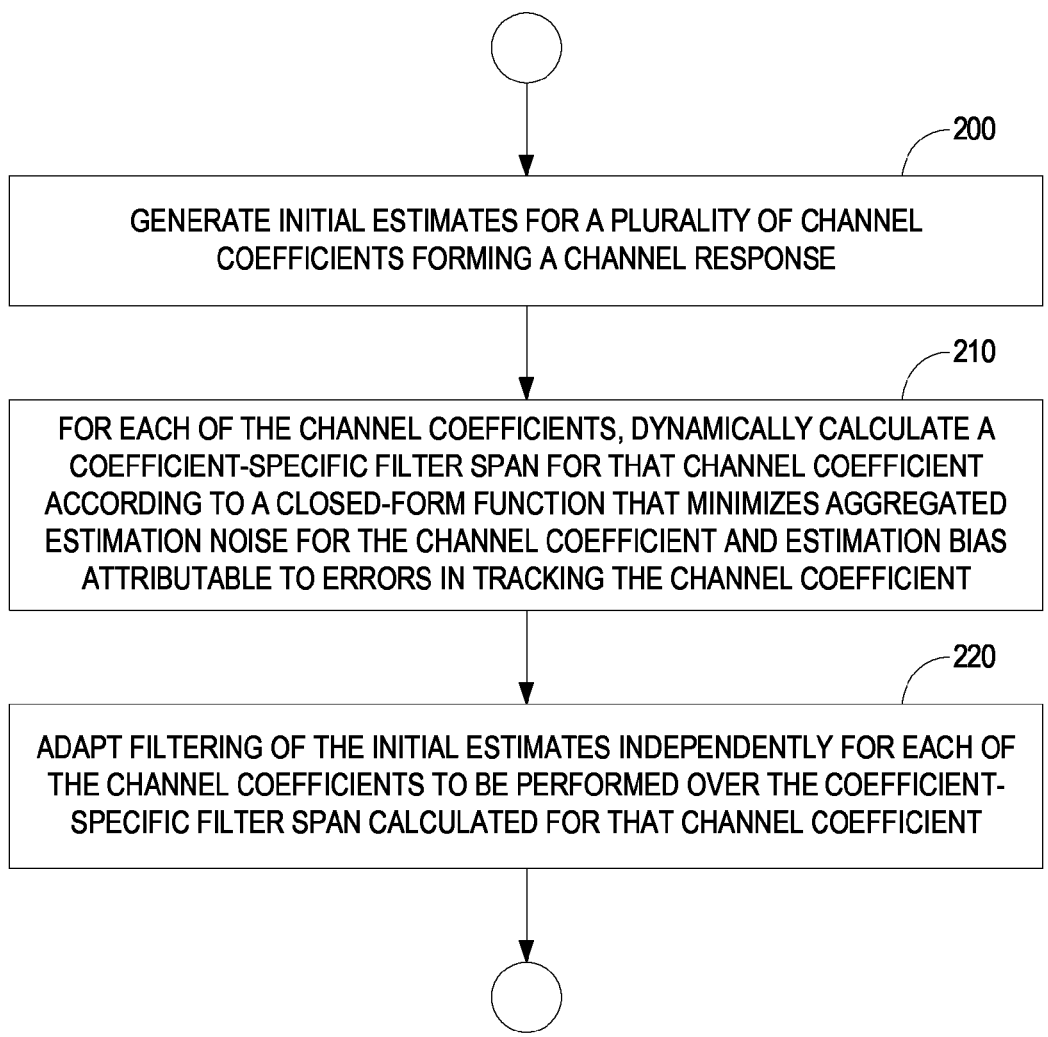
FIG. 8 is a logic flow diagram of a method implemented by a wireless communication node for channel estimation according to one or more embodiments.

With the above points of variation and implementation of the receiver 16 in mind, those skilled in the art will appreciate that a wireless communication node (e.g., the base station 12 or the wireless communication device 14) herein generally performs the processing shown in FIG. 8. According to FIG. 8, processing at the receiver/node includes generating, based on samples 31 of a received signal 26, initial estimates of a plurality of channel coefficients forming a channel response (Block 200). Processing at the receiver/node further entails, for each of the channel coefficients, dynamically calculating a coefficient-specific filter span for that channel coefficient according to a closed-form function $f(\bullet)$ that minimizes aggregated estimation noise for the channel coefficient and estimation bias attributable to errors in tracking the channel coefficient (Block 210). Finally, processing at the receiver/node includes adapting filtering of the initial estimates independently for each of the channel coefficients to be performed over the coefficient-specific filter span calculated for that channel coefficient (Block 220).

Figure 9:
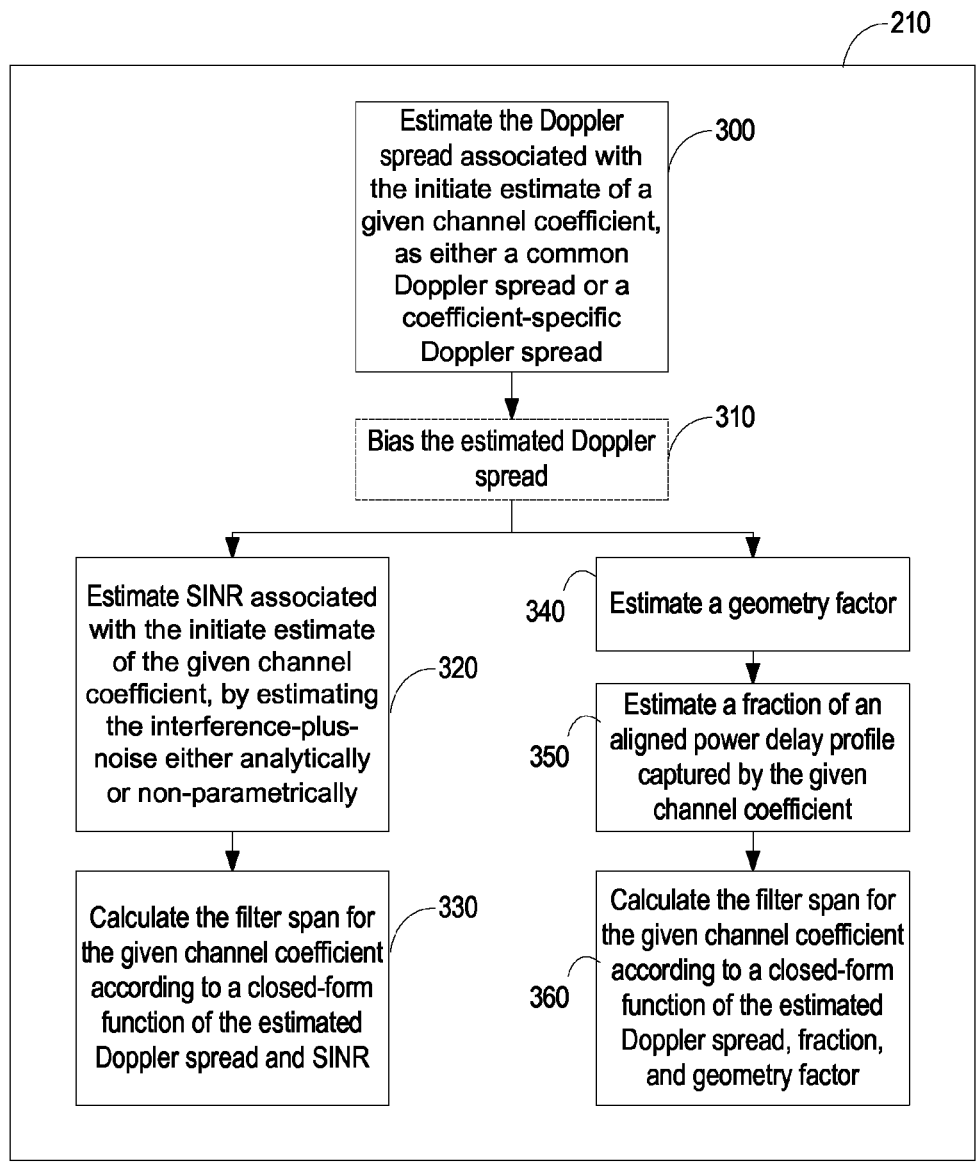
FIG. 9 is a logic flow diagram illustrating different embodiments for performing a step of the method in FIG. 8.

FIG. 9 illustrates different embodiments for calculating the coefficient-specific filter span for any given channel coefficient, according to Block 210 of FIG. 8. As shown in FIG. 9, this calculation (Block 210) according to some embodiments includes estimating the Doppler spread associated with the initial estimate of the given channel coefficient (Block 300). This Doppler spread is estimated either as a common Doppler spread (common to multiple channel coefficients) or as a coefficient-specific Doppler spread. In either case, the Doppler spread in one or more embodiments is optionally biased, e.g., to guard against under-estimation (Block 310).

In one embodiment, calculation further includes estimating the SINR associated with the initial estimate of the given channel coefficient (Block 320). This SINR estimation entails estimating the associated interference-plus-noise either analytically (e.g., according to equation (7)) or non-parametrically. Then, the filter span for the given channel coefficient is calculated according to a closed-form function of the estimated SINR and Doppler spread (e.g., according to equation (6)) (Block 330).

Alternatively in another embodiment, calculation further includes estimating the geometry factor (Block 340) and estimating the fraction of an aligned power delay profile captured by the given channel coefficient (Block 350). Then, the filter span for the given channel coefficient is calculated according to a closed-form function of the estimated Doppler spread, fraction, and geometry factor (e.g., according to equation (8)) (Block 360).

Figure 10:
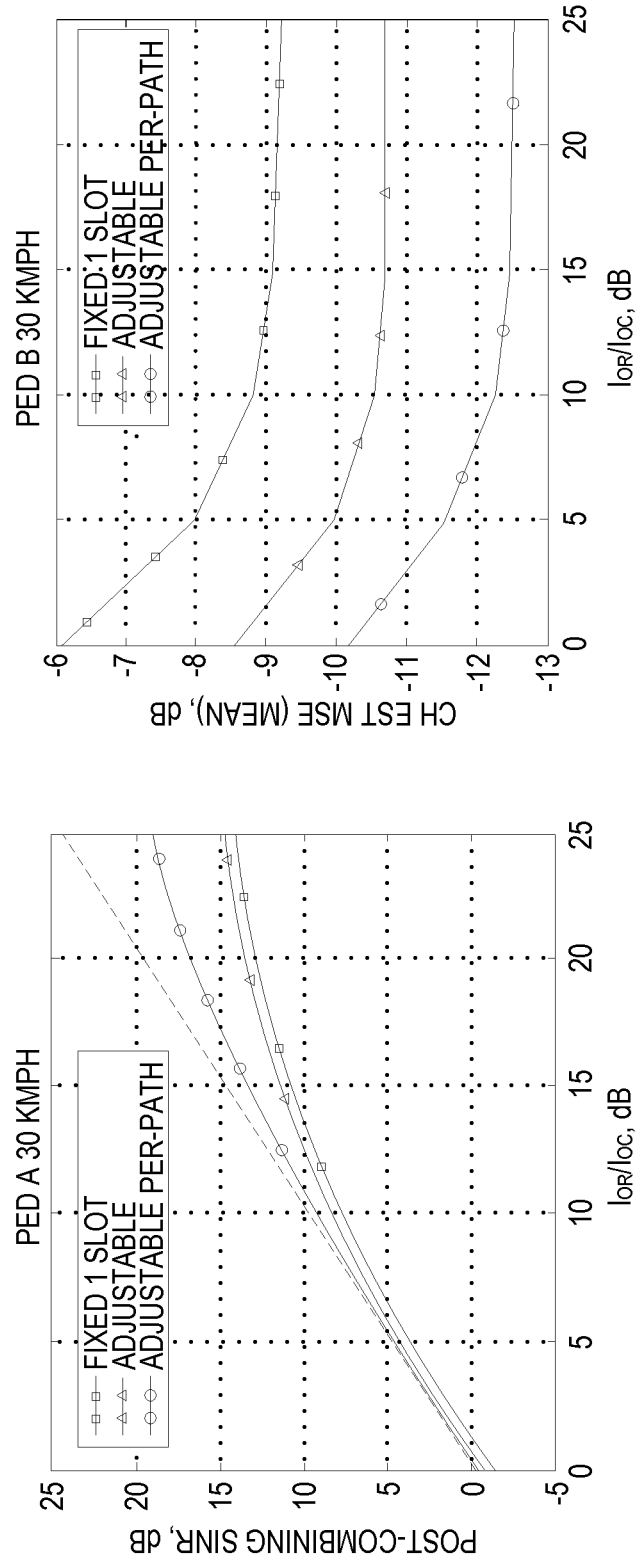
FIG. 10 illustrates various plots demonstrating performance improvements achieved by one or more embodiments in an HSPA context.

FIG. 10 shows that performing channel estimation as described herein advantageously improves post-combining symbol SINR and channel estimate mean-square error (MSE). Specifically, FIG. 10 considers channel estimation in an HSPA network for Pedestrian A (Ped A) 30 kmph and Pedestrian B (Ped B) 30 kmph scenarios. The left plot shows the post-demodulation SINR for a fixed baseline filtering approach over 1 slot, a conventional adjustable/adaptable filtering approach that applies the best-performing filtering time to the entire channel response, and the adjustable/adaptable filtering approach herein that applies coefficient-specific (or path/delay specific in this case) optimal filtering to each channel coefficient. The dashed line shows performance with ideal channel estimates for reference. The practical filtering approach described herein outperforms the other practical approaches, with the demodulation SINR gains being even more considerable for higher-speed scenarios.

The right plot in FIG. 10 shows that the channel estimate MSE after filtering according to embodiments herein is improved as compared to the other approaches. The improved MSE may help channel quality indicator (CQI) reporting and signal regeneration even in scenarios when the demodulation SINR improvement is less significant.

Of course, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of channel estimation in a wireless communication node, comprising:
   generating, based on samples of a received signal, initial estimates of a plurality of channel coefficients forming a channel response;
   for each of the channel coefficients, dynamically calculating a coefficient-specific filter span for that channel coefficient according to a closed-form function that minimizes aggregated estimation noise for the channel coefficient and estimation bias attributable to errors in tracking the channel coefficient; and
   adapting filtering of the initial estimates independently for each of the channel coefficients to be performed over the coefficient-specific filter span calculated for that channel coefficient.

2. The method of claim 1, wherein the closed-form function according to which the coefficient-specific filter span is calculated for any given one of the channel coefficients expresses that filter span as a function of a signal-to-interference-plus-noise ratio (SINR) associated with the initial estimate of the given channel coefficient and a Doppler spread associated with the given channel coefficient.

3. The method of claim 2, further comprising estimating the SINR associated with the initial estimate of the given channel coefficient by non-parametrically estimating an interference-plus-noise power associated with that initial estimate.

4. The method of claim 2, wherein the channel response is a direct-sequence code division multiple access channel response, and wherein the method further comprises estimating the SINR associated with the initial estimate of the given channel coefficient by analytically computing an interference-plus-noise power associated with that initial estimate as a function of interfering power leaked into the initial estimate during despreading and a geometry factor comprising the ratio of total transmitted power received at the node to the total interference-plus-noise power at the node.

5. The method of claim 2, further comprising estimating the Doppler spread associated with the given channel coefficient by biasing an initial estimate of the Doppler spread by an amount determined as a function of a reliability of that initial estimate.

6. The method of claim 2, further comprising estimating a common Doppler spread that is commonly associated with the plurality of channel coefficients forming the channel response, and wherein the Doppler spread associated with the given channel coefficient comprises the common Doppler spread.

7. The method of claim 2, further comprising estimating different Doppler spreads as being associated with different channel coefficients forming the channel response, the Doppler spread associated with the given channel coefficient differing from the Doppler spread associated with at least one other channel coefficient.

8. The method of claim 1, wherein the channel response is a direct-sequence code division multiple access channel response, and wherein the closed-form function according to which the coefficient-specific filter span is calculated for any given one of the channel coefficients expresses that filter span as a function of a Doppler spread associated with the given channel coefficient, a fraction of an aligned power delay profile captured by the given channel coefficient, and a geometry factor comprising the ratio of total transmitted power received at the node to the total interference-plus-noise power at the node.

9. The method of claim 8, further comprising estimating the Doppler spread associated with the given channel coefficient by biasing an initial estimate of the Doppler spread by an amount determined as a function of a reliability of that initial estimate.

10. The method of claim 8, further comprising estimating a common Doppler spread that is commonly associated with the plurality of channel coefficients forming the channel response, and wherein the Doppler spread associated with the given channel coefficient comprises the common Doppler spread.

11. The method of claim 8, further comprising estimating different Doppler spreads as being associated with different channel coefficients forming the channel response, the Doppler spread associated with the given channel coefficient differing from the Doppler spread associated with at least one other channel coefficient.

12. The method of claim 1, wherein the closed-form function according to which the coefficient-specific filter span is calculated for any given one of the channel coefficients expresses that filter span as a function of a reference estimation noise power for a reference filter span as well as a function of a reference estimation bias power for a reference Doppler spread and a reference filter span.

13. The method of claim 1, wherein the closed-form function according to which the coefficient-specific filter span is calculated for any given one of the channel coefficients expresses that filter span as a function of one or more parameters associated with a type of said adaptive filtering to be performed.

14. The method of claim 1, wherein said calculating and adapting is performed iteratively over the plurality of channel coefficients, and wherein, responsive to obtaining filtered estimates for each of the plurality of channel coefficients, the method further comprises providing the channel response formed from the filtered estimates for further processing of the received signal.

15. A receiver for use in a wireless communication node, wherein the receiver comprises:
an initial estimate circuit configured to generate, based on samples of a received signal, initial estimates of a plurality of channel coefficients forming a channel response;
a filtering circuit configured to filter the initial estimates; and
a configuration circuit configured to:
for each of the channel coefficients, dynamically calculate a coefficient-specific filter span for that channel coefficient according to a closed-form function that minimizes aggregated estimation noise for the channel coefficient and estimation bias attributable to errors in tracking the channel coefficient; and
adapt filtering by the filtering circuit of the initial estimates independently for each of the channel coefficients to be performed over the coefficient-specific filter span calculated for that channel coefficient.

16. The receiver of claim 15, wherein the closed-form function according to which the coefficient-specific filter span is calculated for any given one of the channel coefficients expresses that filter span as a function of a signal-to-interference-plus-noise ratio (SINR) associated with the initial estimate of the given channel coefficient and a Doppler spread associated with the given channel coefficient.

17. The receiver of claim 16, wherein the receiver further comprises a SINR estimation circuit configured to estimate the SINR associated with the initial estimate of the given channel coefficient by non-parametrically estimating an interference-plus-noise power associated with that initial estimate.

18. The receiver of claim 16, wherein the channel response is a direct-sequence code division multiple access channel response, and wherein the receiver further comprises a SINR estimation circuit configured to estimate the SINR associated with the initial estimate of the given channel coefficient by analytically computing an interference-plus-noise power associated with that initial estimate as a function of interfering power leaked into the initial estimate during despreading and a geometry factor comprising the ratio of total transmitted power received at the node to the total interference-plus-noise power at the node.

19. The receiver of claim 16, wherein the receiver further comprises a Doppler spread estimation circuit configured to estimate the Doppler spread associated with the given channel coefficient by biasing an initial estimate of the Doppler spread by an amount determined as a function of a reliability of that initial estimate.

20. The receiver of claim 16, wherein the receiver further comprises a Doppler spread estimation circuit configured to estimate a common Doppler spread that is commonly associated with the plurality of channel coefficients forming the channel response, and wherein the Doppler spread associated with the given channel coefficient comprises the common Doppler spread.

21. The receiver of claim 16, wherein the receiver further comprises a Doppler spread estimation circuit configured to estimate different Doppler spreads as being associated with different channel coefficients forming the channel response, the Doppler spread associated with the given channel coefficient differing from the Doppler spread associated with at least one other channel coefficient.

22. The receiver of claim 15, wherein the channel response is a direct-sequence code division multiple access channel response, wherein the receiver further comprises a geometry factor circuit configured to estimate a geometry factor comprising the ratio of total transmitted power received at the node to the total interference-plus-noise power at the node, wherein the receiver further comprises an aligned power delay profile (PDP) fraction calculation circuit configured to calculate a fraction of an aligned PDP captured by any given one of the channel coefficients, and wherein the closed-form function according to which the coefficient-specific filter span is calculated for the given channel coefficient expresses that filter span as a function of a Doppler spread associated with the given channel coefficient, the fraction of the aligned PDP captured by the given channel coefficient, and the geometry factor.

23. The receiver of claim 22, wherein the receiver further comprises a Doppler spread estimation circuit configured to estimate the Doppler spread associated with the given channel coefficient by biasing an initial estimate of the Doppler spread by an amount determined as a function of a reliability of that initial estimate.

24. The receiver of claim 22, wherein the receiver further comprises a Doppler spread estimation circuit configured to estimate a common Doppler spread that is commonly associated with the plurality of channel coefficients forming the channel response, and wherein the Doppler spread associated with the given channel coefficient comprises the common Doppler spread.

25. The receiver of claim 22, wherein the receiver further comprises a Doppler spread estimation circuit configured to estimate different Doppler spreads as being associated with different channel coefficients forming the channel response, the Doppler spread associated with the given channel coefficient differing from the Doppler spread associated with at least one other channel coefficient.

26. The receiver of claim 15, wherein the closed-form function according to which the coefficient-specific filter span is calculated for any given one of the channel coefficients expresses that filter span as a function of a reference estimation noise power for a reference filter span as well as a function of a reference estimation bias power for a reference Doppler spread and a reference filter span.

27. The receiver of claim 15, wherein the closed-form function according to which the coefficient-specific filter span is calculated for an individual channel coefficient expresses that filter span as a function of one or more parameters associated with a type of said filtering to be performed.

28. The receiver of claim 15, wherein the configuration circuit is configured to perform said calculating and adapting iteratively over the plurality of channel coefficients, and wherein, responsive to obtaining filtered estimates for each of the plurality of channel coefficients, the filtering circuit is configured to provide the channel response formed from the filtered estimates to one or more additional processing circuits for further processing of the received signal.

29. A wireless communication node comprising a receiver, wherein the receiver comprises:
an initial estimate circuit configured to generate, based on samples of a received signal, initial estimates of a plurality of channel coefficients forming a channel response;
a filtering circuit configured to filter the initial estimates; and a configuration circuit configured to:
- for each of the channel coefficients, dynamically calculate a coefficient-specific filter span for that channel coefficient according to a closed-form function that minimizes aggregated estimation noise for the channel coefficient and estimation bias attributable to errors in tracking the channel coefficient; and
- adapt filtering by the filtering circuit of the initial estimates independently for each of the channel coefficients to be performed over the coefficient-specific filter span calculated for that channel coefficient.

* * * * *

UNITED STATES PATENT AND TRADEMARK OFFICE
CERTIFICATE OF CORRECTION

PATENT NO. : 8,842,789 B2
APPLICATION NO. : 13/679064
DATED : September 23, 2014
INVENTOR(S) : Reial Page 1 of 1

It is certified that error appears in the above-identified patent and that said Letters Patent is hereby corrected as shown below:

In the Specification

In Column 5, Line 51, delete " $\hat{h}_1^{filt}$ " and insert -- $\hat{h}_J^{filt}$ --, therefor.

In Column 5, Line 61, delete "θ(•)" and insert -- $f(•)$ --, therefor.

In Column 13, Line 27, delete "(COI)" and insert -- (CQI) --, therefor.

Signed and Sealed this
Nineteenth Day of May, 2015

Michelle K. Lee
*Director of the United States Patent and Trademark Office*